Aug. 25, 1953  J. R. GAMMETER  2,649,960
APPARATUS FOR TESTING AND SORTING THIN RUBBER ARTICLES
Filed June 10, 1949  4 Sheets-Sheet 1

INVENTOR.
JOHN R. GAMMETER
BY
William Cleland
ATTORNEY

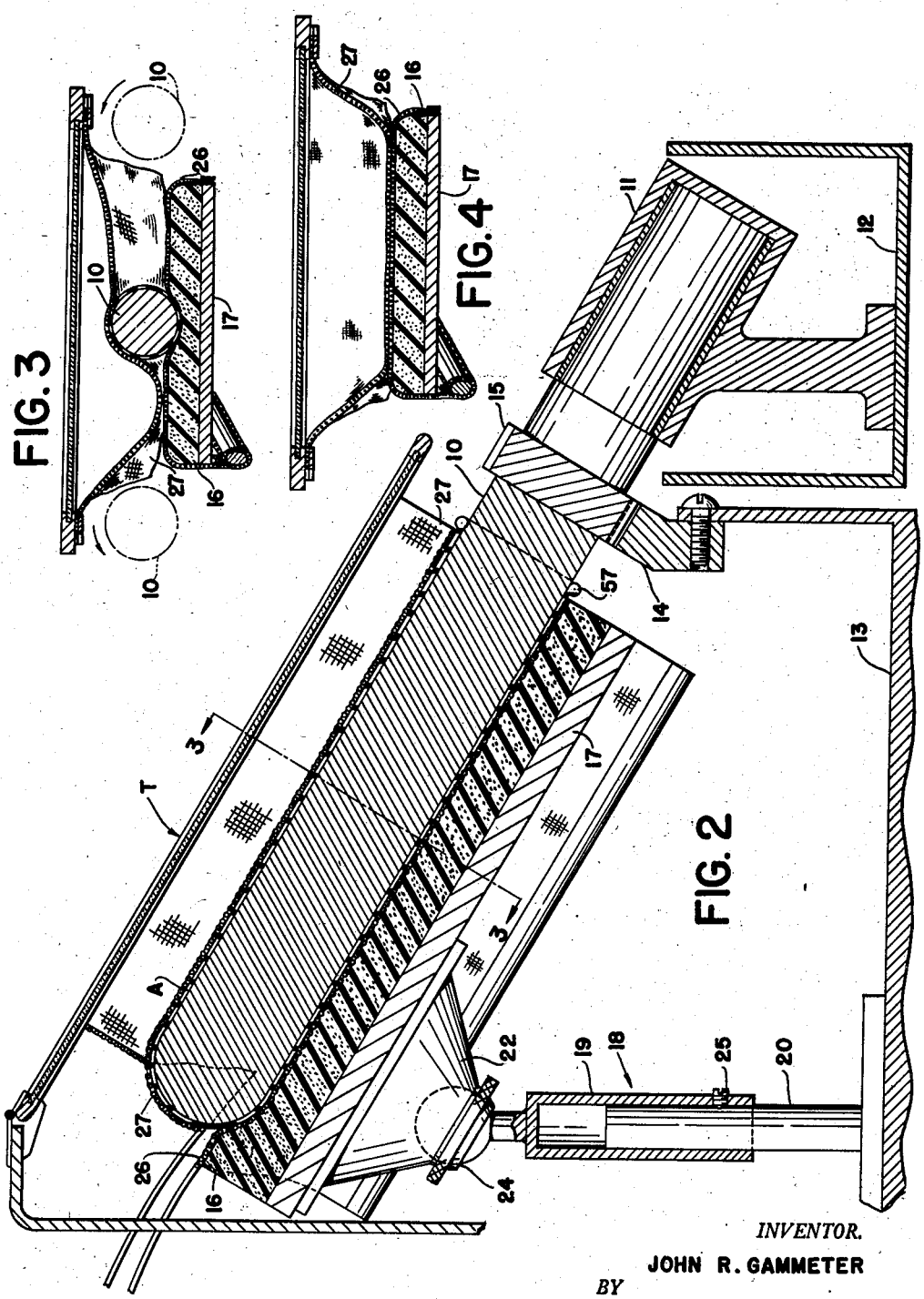

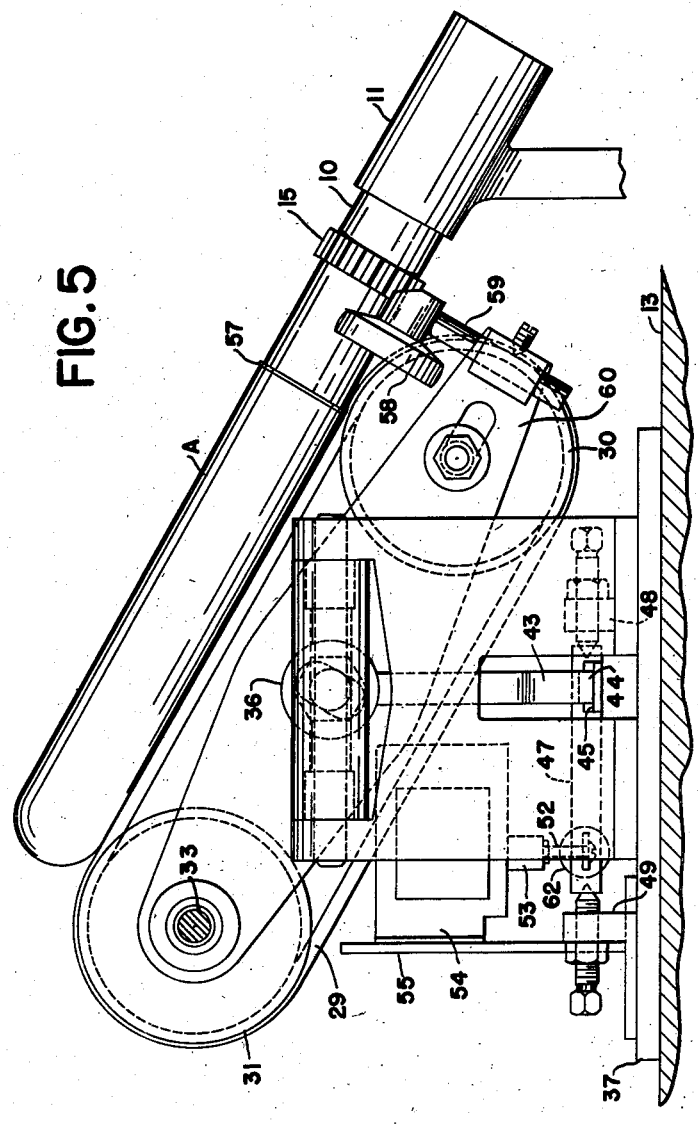

Aug. 25, 1953 J. R. GAMMETER 2,649,960
APPARATUS FOR TESTING AND SORTING THIN RUBBER ARTICLES
Filed June 10, 1949 4 Sheets-Sheet 4

INVENTOR.
JOHN R. GAMMETER
BY
William Cleland
ATTORNEY

Patented Aug. 25, 1953

2,649,960

UNITED STATES PATENT OFFICE 2,649,960

APPARATUS FOR TESTING AND SORTING THIN RUBBER ARTICLES

John R. Gammeter, Akron, Ohio

Application June 10, 1949, Serial No. 98,332

5 Claims. (Cl. 209—81)

1

This invention relates to apparatus for testing and sorting thin articles, and particularly thin hollow rubber articles.

Gammeter Patent No. 2,221,323 disclosed apparatus for testing thin rubber goods for defects, by passing the goods received on metal forms into rolling engagement with the underside of a flexible element of metallic mesh material. While this prior structure was generally satisfactory, the effective area of contact between the article and the element was somewhat reduced because conformity of the same about the article was dependent upon non-uniform gravitationally applied forces, particularly around the freely projecting end of the article on the form.

The prior Gammeter patent, No. 2,371,818, shows article-discharging apparatus which might be utilized in conjunction with such testing equipment for removing the articles from the metal forms, but which was limited to use for removing only the good articles from the forms, additional equipment having been necessary for removing the defective goods before reaching said article discharging apparatus. One type of equipment for this purpose utilized blasts of air projected through holes in the ends of the forms, to blow the articles therefrom, but the air holes minimized the efficiency of the testing apparatus to a certain extent because of the absence of metal for passage of electrical current when the defects coincided with the air holes.

One object of the present invention is to provide improved, highly efficient means for electrically testing thin rubber goods for defects, wherein is assured maximum complete coverage of the desired area of the article to be tested including, for example, rounded end portions of elongated hollow rubber articles.

Another object of the invention is to provide improved mechanism for sorting out defective articles as manifested by said testing means, by which is eliminated the use of objectionable air holes in the article-carrying forms which might otherwise allow some defective articles to pass as good ones.

Another object of the invention is to provide testing and sorting apparatus of the character described which is substantially fool-proof and free of the restrictions usually incident to the human element.

Other objects of the invention will be manifest from the following brief description and the accompanying drawings.

2

Of the accompanying drawings:

Figure 2 is an enlarged vertical cross-section through electrical testing unit embodying features of the invention, the same being taken substantially on the line 2—2 of Figure 1.

Figure 3 is a cross-section taken substantially on the line 3—3 of Figure 3, showing a form passing through the testing unit.

Figure 4 is a view similar to Figure 3, but illustrating the condition in which no form is passing through the unit.

Figure 5 is a cross-section of an improved article sorting unit embodying features of the invention, in operative position for removing articles from forms, the same being taken substantially on the line 5—5 of Figure 1.

Figure 1:
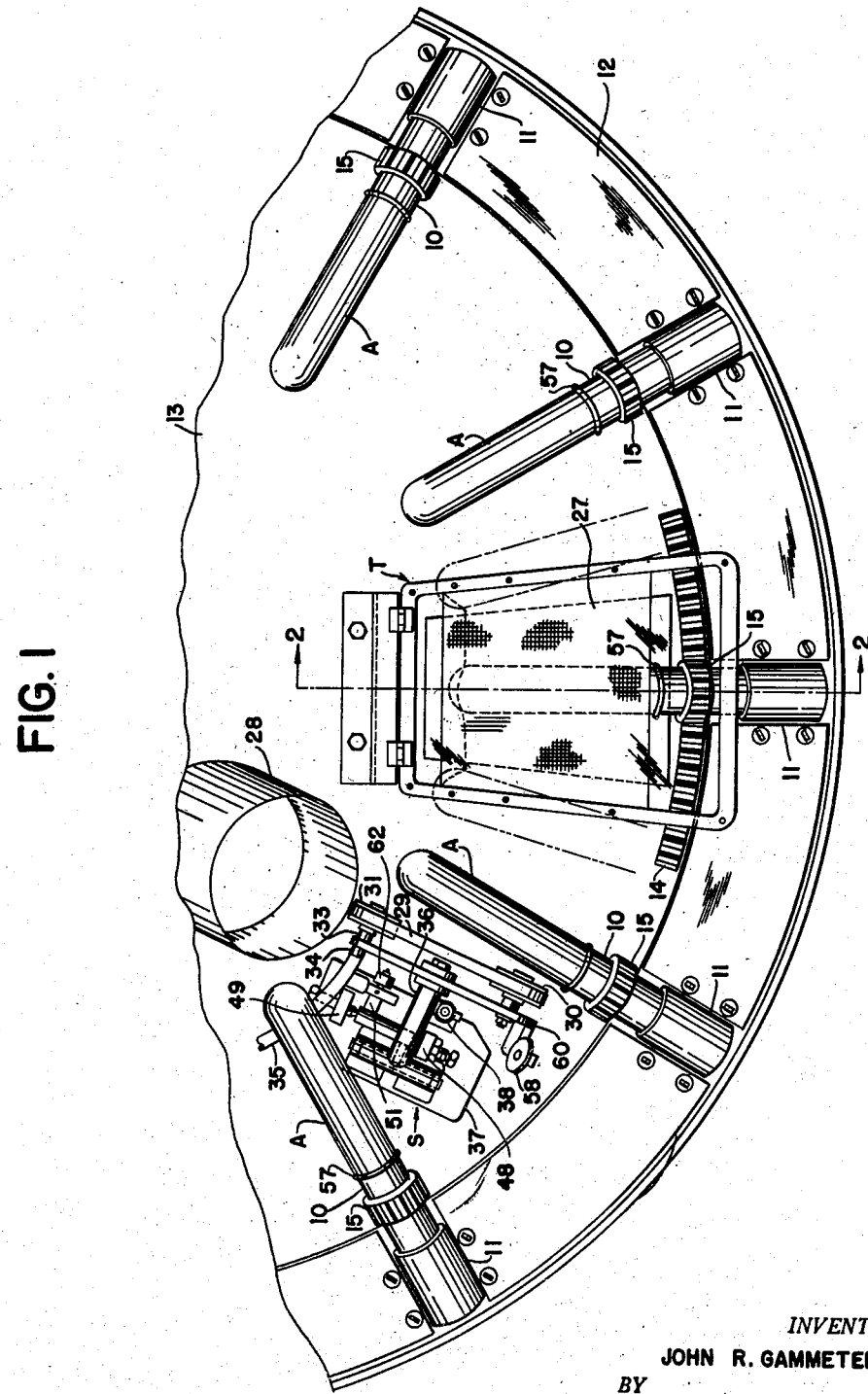
Figure 1 is a top plan view, partly broken away, illustrating improved apparatus for testing and sorting thin rubber articles.

Referring to the drawings, the numerals 10, 10 indicate a plurality of metal forms rotatably supported on mountings 11, 11 peripherally spaced on an annular conveyor or plate 12. This conveyor 12 is mounted to rotate about a fixed circular table 13, in clockwise direction as viewed in Figure 1, to convey the forms through an electrical testing unit T for manifesting defective articles on the forms, and also for conveying the forms past an article-sorting unit S which automatically discharges the defective articles from the forms, as manifested by the testing unit. Suitable mechanism for rotating the conveyor 12 about a vertical axis at the center of the table 13 is illustrated in said prior Patent No. 2,221,323. The forms as shown are of suitable shape to receive thereon in distended, unwrinkled condition, thin hollow rubber articles A, such as prophylactics, finger cots, or the like which are open at one end and rounded at the other. That is, the forms are electro-conductive while the articles thereon are of dielectric material, which characteristics are utilized in the present process for testing the articles.

In order to facilitate application of the articles to be tested onto the forms 10, at a point to the right of the tester T as viewed in Figure 1, the forms extend freely radially inwardly of the conveyor 12 at an upwardly inclined angle. For rotating the forms as they move through the testing unit T, a suitable length of toothed rack 14 secured to the fixed table 13 is engageable by pinions 15 fixed on the ends of the forms adjacent the mountings thereof.

For electrically testing the articles, the rotating forms are thus moved in succession through testing unit T. Each form, while rotated by engagement of its pinion 15 with rack 14, is moved in an arcuate path into yielding engagement with a flat, resilient pad 16 presented upwardly on a hard backing plate 17, which is mounted on a support 18. This support includes a sleeve 19 vertically slidably adjustable on an upright rod 20 fixed on table 13, and a head 22 swivelly connected to said sleeve, said backing plate being secured to said head. The swivel connection for said head may include a ball joint 24 having a clamping nut which is rotatable to clamp the head with said pad thereon in various angularly adjusted positions with respect to the horizontal, and in particular to adjust the plane of the upper surface of the pad 16 so that when a form is rolled over the pad the latter will conform to approximately one quarter of the surface area of an article A on the form. Vertical adjustment of the sleeve on rod 20 is accomplished through a set screw 25.

The pad 16 may be of soft resilient material such as foam rubber or like spongy elastic material, and the exposed rubber surface portion thereof may be covered with a thin element 26 of flexible electro-conductive material, such as fine wire mesh fabric of the type used for ladies' handbags. Thus, the element 26 is limply flexible or flaccid and, therefore, deeply depressible with the material of the pad to conform to a substantial proportion of the surface area of an article A on said form. In order that the resiliency of pad 16 will not be materially detracted from, the trailing edge of element 26 may be secured to a corresponding edge of the backing plate 17, and the leading end of element 26 weighted at 26a for yieldingly maintaining the element in taut condition over the top of pad 16.

The electro-conductive element 26 and each form 10 are suitably connected in an electrical circuit (not shown) providing a source of high potential current (approximately 1200 v.). Completion of the circuit through the element and a form passing over the same is normally prevented by presence of a rubber article A on the form. A suitable circuit for this purpose is shown and described in said Patent No. 2,221,323, wherein the electrical potential is sufficient to leap an air gap corresponding to the wall thickness of article A but normally insufficient to pierce the goods. That is, when the articles contain thin spots, or are predeterminately under gauge, or have "pin holes" in the same, current will jump the gap provided between form 10 and element 26 through the wall of the article (see Figure 3) and will flow through the high tension circuit. This closing of the electrical circuit may be utilized to manifest the presence of articles which are defective for the reasons stated, in a manner to be described later. Element 26 is insulated from the table 13 by the dielectric nature of the rubber pad 16.

The element 26 may be supplemented by a similar element 27 of flexible wire mesh suspended in sagging relation whereby the element is adapted to drape over and conform to the upper portions of a form passing over the pad 16, the element 27 being connected in said high potential circuit, in parallelism with element 26 and being normally insulated from the form by the rubber article thereon as described above and otherwise being operable substantially in the manner set forth in Patent No. 2,221,323. Element 27 may have dependent therefrom, a strip of similar flexible wire mesh fabric, constituting an apron 27a adapted to conform closely to the rounded inner ends of the articles on the forms. Because the elements 26 and 27 are in parallelism in the circuit they may contact each other without disturbing the effectiveness of the circuit.

The presence of defective goods on a form 10 is electrically manifested in the sorting unit S, automatically to strip the defective article from the form and eject it into a funnel 28, mounted on table 13, to drop into a container (not shown).

The sorting unit S includes an endless V-belt 29, which may be of fabric-reinforced rubber, extended between two pulleys 30 and 31 rotatably mounted on a vertically shiftable bracket 32, the shaft or spindle 33 of one pulley 31 being rotatable therewith and having an extension 34 to which is attached a flexible cable 35 from a power-driven device (not shown) for rotating the pulley and thereby operating the belt to move the straight upper reach thereof in a direction inwardly of the conveyor 12.

Bracket 32 is vertically shiftably mounted for moving said belt toward and from the path of the lower surface portions of the forms carried by conveyor 12. Accordingly, the bracket is vertically adjustably secured on the free end of an arm 36 which is pivoted at its opposite end to a fixed upright on a base 37 suitably secured to table 13, the arm 36 being yieldingly urged toward a raised position as by means of a compression spring 38 arranged between a pivoted lug 39 adjacent the free end of arm 36 and a fixed lug 40 mounted on said base. An elongated bolt 41 may extend from the pivoted lug 39 downwardly through spring 38 and an aperture in fixed lug 40, the lower end of the bolt having nut 42 adjustably threaded thereon for limiting upward movement of bracket arm 36 as urged by the spring.

Figure 6:
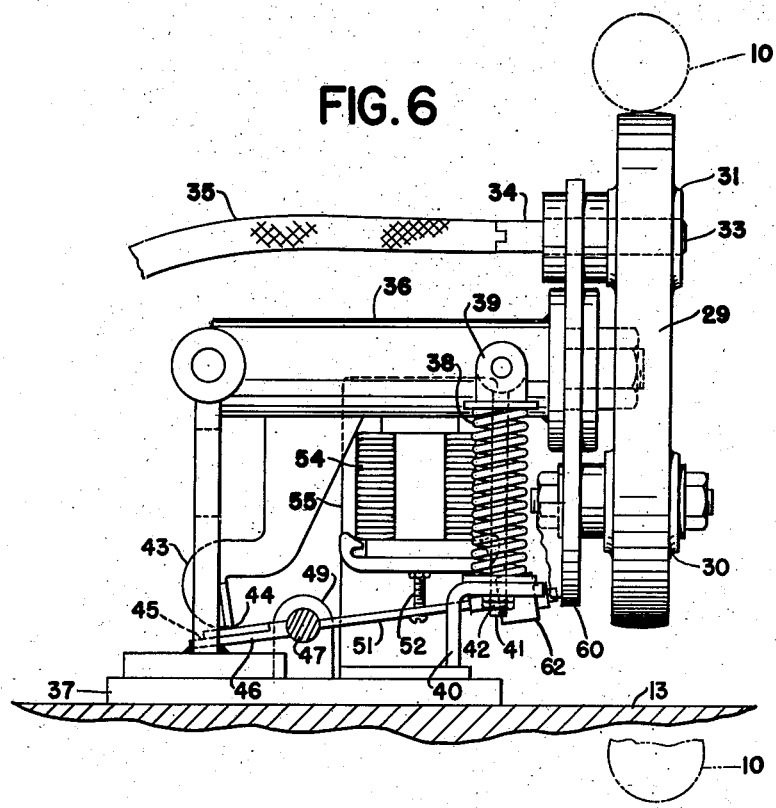
Figure 6 is rear elevation, partly broken away, of the sorting unit as viewed from the left of Figure 5.
Figure 7:
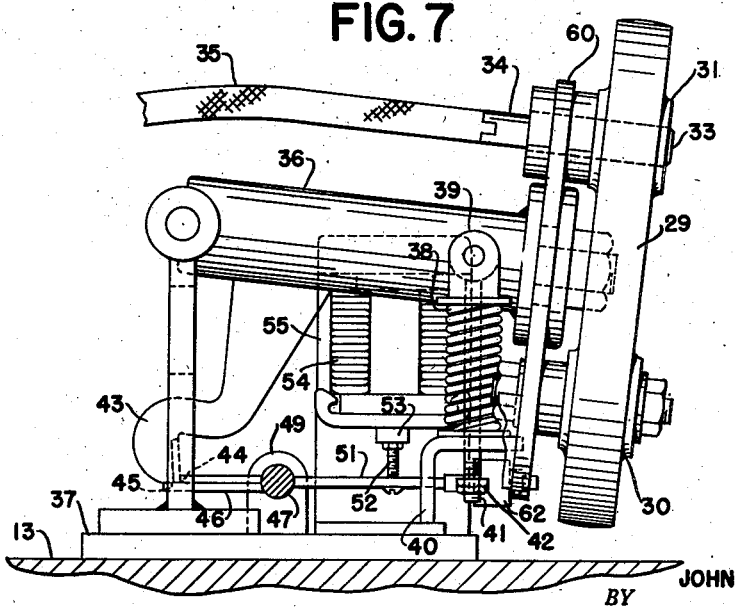
Figure 7 is a view similar to Figure 6, but showing the unit in inoperative position with respect to the forms.

The arm 36 and component parts are adapted to be normally releasably held in the lowered position shown in Figure 7, to be away from the path of the forms 10, by a downwardly extending finger 43 having an edge 44 thereof engaging a shouldered or notched portion 45 in a trip lever 46 extending in horizontal direction from a shaft 47 pivoted between spaced lugs 48 and 49; the arrangement being such that spring 38 tends to urge the finger 43 into firm stop engagement with the notched portion of lever 46. Extending horizontally outwardly of shaft 17 in the opposite direction from lever 46 is an arm 51 which is apertured slidingly to receive a threaded pin 52 extending from the lower end of an armature 53 of an electro-magnetic coil 54 mounted on a bracket 55 on base 37. The coil 54 is connected to the above described electrical circuit to be momentarily energized upon passage of current between any form 10 having a defective article thereon, and either one or both of the elements 26 and 27. Energization of the coil is effective to withdraw the coil armature 53 upwardly and thereby engage a head 56 on pin 52 with the underside of arm 51, which pivots trip lever 46 downwardly, thereby disengaging finger 43 from the lever 46 and allowing spring 38 to urge arm 36 upwardly until nuts 42 engage lug 40, as shown in Figure 6. In this up position of arm 36 the upper reach of belt 29 is positioned in the arcuate path of the lower portions of forms 10 and engages the articles lengthwise to strip the same from the forms. When the articles of the type shown are provided with integral reinforcing rings 57 the belt may be driven at a desired linear speed with relation to the speed of the conveyor 12 to engage the rings 57 and roll the articles upon themselves toward the free inner ends of the forms and finally eject the rolled article into said chute 28. In order to assure efficient removal of the articles from the forms, the upper reach of belt 29 preferably is arranged to engage the articles at a slight angle to the longitudinal axis of the forms.

After a defective article A has been ejected from its form 10 it is desirable to reset the sorting unit with the belt 29 in lowered position, so that a next succeeding form having a perfect article thereon may be carried by conveyor 12 to a station (not shown) at which the perfect articles are removed from the forms in any suitable manner. To this end, any form 10 upon passing over the belt 29 in raised position thereof, moves into contact of a base portion thereof with a roller 58 on the upper end of a rod 59 vertically adjustably secured on the pulley-supporting plate 60 of pivoted arm 36 (see Figure 5), and thereby urges said arm 36 downwardly against the action of spring 38 until finger 43 reengages trip lever 46, to lock the arm 36 and associated parts in the lowered position shown in Figure 7. An adjustable counter-weight 62 on the free end of arm 51 assures that trip lever 46 will be held in frictional engagement with the finger 43 at all times. As coil 54 is only momentarily operated by the testing apparatus, for each defective article, the armature 53 does not affect reengagement of the trip mechanism as described.

In operation of the apparatus described for continuously testing and sorting thin rubber articles A, and operator stationed at the right of testing unit T (as viewed in Figure 1) applies an article to be tested to each form 10 on annular conveyor 12 as it is continuously rotated about table 13, the articles fitting on the forms in smooth unwrinkled condition. The forms pass in succession between the testing elements 26 and 27, which are so proportioned in size with respect to the spacing of the forms that no more than one form at a time can be in contact with the elements. Each form in moving into contact with element 26 of pad 16 yieldingly depresses the pad to conform the element about the lower half of the article on the form, the form at the same time being rotated against the surface of the element in direction opposed to the direction of arcuate travel of the form and at a greater linear speed than the conveyor, thereby assuring maximum contact between the element and the outer surface of the article, including the closed free end of the article. Frictional engagement of the draped upper element 27 with the upper surface portions of the article on its moving form adds to the efficiency of the device.

Complete coverage of an article being tested is assured by the fact that in addition to dragging engagement thereof against the upper element 26, there is a rolling yielding engagement of the same against the element 27 for approximately one and one-half revolutions of the form.

If rubber articles on the forms 10 are perfect as to gauge and quality they will provide requisite insulation between the electro-conductive elements 26 and 27 and the metal forms moving between said elements. Should a form passing between the elements contain an article which is under gauge, in whole or in part, or which has even a tiny "pin-hole" in it, a current of high potential electricity will flow between the element 26 and/or 27 and the respective form, momentarily to energize the electro-magnetic coil 54 of sorting unit S.

Momentary energization of electro-magnet 54 of unit S instantaneously operates trip-lever 46 to release finger 43, allowing spring 38 to urge arm 36 upwardly and present the upper reach of bolt 29 in the path of the form containing the defective article as it leaves the testing unit. Accordingly, the upper reach of the continuously moving belt will engage the article in lengthwise direction thereof and strip it from the form, the force applied by the belt being effective to project the stripped article directly into the "defective goods" funnel 28.

Immediately after the thus bared form moves past the belt 29 the roller 58, carried by the belt-supporting arm 36, is engaged by said bare form to urge arm 36 downwardly against the action of spring 38, until the finger 43 is in locked engagement with the trip lever 46 for holding the belt out of the path of movement of the forms. It will be readily seen that the apparatus is adapted for effectively testing and sorting articles on adjacent forms in quick succession.

The apparatus of the present invention is not only highly efficient in operation, but is substantially fool-proof in the detection of defective articles of the character described.

Modifications of the invention may be resorted to without departing from the spirit thereof or the scope of the appended claims.

What I claim is:

1. Apparatus for testing thin rubber-like articles of dielectric material for defects, comprising an elongated electro-conductive form of generally cylindrical cross-sectional shape and having an outer end portion on which form the article may be received in distended condition, relatively fixed supporting means including a relatively rigid backing member, a resiliently depressible pad of soft spongy elastic material mounted on said backing member and presenting a face of broad lateral area freely outwardly, the outer surface portion of said face constituting a relatively thin layer of flaccid electro-conductive material, the pad being relatively thick and the layer being highly flexible so that the same is conformable to substantial depth with the spongy material of the pad under edgewise pressure of said form to embrace and contact a substantial radial depth of the form and contact said end portion, conveyor means for rolling said form across said surface portion of said pad and applying said edgewise pressure of the form against the pad and thereby yieldingly to depress said pad and conform said electro-conductive layer to a substantial proportion of the surface area of an article on the form, means for maintaining electrical potential between said form and electro-conductive layer sufficient to leap an air gap through the wall of the article, or to pierce an article of less than predeterminately normal thickness, and responsive means for manifesting passage of electrical current between said form and said electro-conductive layer.

2. Apparatus for testing articles of dielectric material for defects, comprising an electro-conductive form on which the article may be received, relatively fixed supporting means, including a relatively rigid backing member, a resiliently depressible pad of spongy elastic material mounted on said backing member and presenting a face thereof of broad lateral area freely outwardly, at least the outer surface portion of said face being of limply flexible electro-conductive material, means for relatively conveying said form across said surface portion of said pad yieldingly to depress the pad to a substantial depth and thereby conform said flexible surface portion thereof to a substantial area of the surface of an article on the form, and means for maintaining electrical potential between said form and said electro-conductive surface portion sufficient to leap an air gap through the wall of the article or to pierce an article of less than predeterminately normal thickness, and responsive means for manifesting passage of electrical current between said form and electro-conductive surface portion, said surface portion comprising an element of flexible metallic mesh fabric mounted against said pad.

3. Apparatus for testing articles of dielectric material for defects, comprising an electro-conductive form on which the article may be received, relatively fixed supporting means including a relatively rigid backing member, a resiliently depressible pad of spongy elastic material mounted on said backing member and presenting a face thereof of broad lateral area freely outwardly, at least the outer surface portion of said face being of limply flexible electro-conductive material, means for relatively conveying said form across said surface portion of said pad yieldingly to depress the pad to a substantial depth and thereby conform said flexible surface portion thereof to a substantial area of the surface of an article on the form, and means for maintaining electrical potential between said form and said electro-conductive surface portion sufficient to leap an air gap through the wall of the article or to pierce an article of less than predeterminately normal thickness, and responsive means for manifesting passage of electrical current between said form and electro-conductive surface portion, said apparatus including a series of said forms, said surface portion of said pad being upwardly presented, a member of flexible metallic mesh fabric being mounted in sagging condition over said pad for conforming to the upper surface portions of articles on the forms, said form-conveying means including mechanism for rotating said forms in succession between said member and said surface portion, said member being in electrical connection with said electrical potential means to the forms.

4. Apparatus as set forth in claim 1, said backing member being angularly and vertically adjustably mounted with respect to the path of rolling movement of said form by said conveyor means.

5. Apparatus as set forth in claim 1, wherein said form is rotated against said electro-conductive layer in direction opposed to the forward travel of the form and at a greater linear speed than said forward travel of the form.

JOHN R. GAMMETER.

References Cited in the file of this patent

UNITED STATES PATENTS

| Number | Name | Date |
| --- | --- | --- |
| 1,952,582 | Cory | Mar. 27, 1934 |
| 2,155,977 | Miller | Apr. 25, 1939 |
| 2,221,323 | Gammeter | Nov. 12, 1940 |
| 2,297,663 | Strassman | Sept. 29, 1942 |
| 2,299,270 | Gammeter | Oct. 20, 1942 |
| 2,353,256 | Maywald | July 11, 1944 |
| 2,371,813 | Gammeter | Mar. 20, 1945 |
| 2,480,142 | Lager | Aug. 30, 1949 |